US008745485B2

(12) United States Patent  (10) Patent No.: US 8,745,485 B2
Hayler  (45) Date of Patent: Jun. 3, 2014

(54) EXTENSIBLE REMOTE TAG MARKUP SYSTEM AND METHOD

(75) Inventor: Don Lewis Hayler, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1157 days.

(21) Appl. No.: 11/161,838

(22) Filed: Aug. 18, 2005

(65) Prior Publication Data

US 2007/0079233 A1   Apr. 5, 2007

(51) Int. Cl.
*G06F 17/00* (2006.01)

(52) U.S. Cl.
USPC ........... 715/239; 715/734; 715/760; 715/854; 707/513; 707/104; 707/755; 707/3; 709/227; 709/235; 709/201; 709/229; 719/328; 345/582

(58) Field of Classification Search
USPC .................................. 715/513, 523; 709/203
See application file for complete search history.

(56) References Cited

U.S. PATENT DOCUMENTS

| | | | | |
|---|---|---|---|---|
| 5,973,696 | A * | 10/1999 | Agranat et al. | 715/760 |
| 6,199,195 | B1 * | 3/2001 | Goodwin et al. | 717/104 |
| 6,415,288 | B1 * | 7/2002 | Gebauer | 1/1 |
| 6,434,619 | B1 * | 8/2002 | Lim et al. | 709/229 |
| 6,456,308 | B1 * | 9/2002 | Agranat et al. | 715/854 |
| 6,671,853 | B1 * | 12/2003 | Burkett et al. | 715/235 |
| 6,804,662 | B1 | 10/2004 | Annau et al. | 707/2 |
| 6,915,485 | B1 * | 7/2005 | Lambrecht et al. | 715/734 |
| 7,631,084 | B2 * | 12/2009 | Thomas et al. | 709/227 |
| 8,037,081 | B2 * | 10/2011 | Douglis et al. | 707/755 |
| 2001/0056460 | A1 * | 12/2001 | Sahota et al. | 709/201 |
| 2002/0049788 | A1 * | 4/2002 | Lipkin et al. | 707/513 |
| 2002/0055956 | A1 | 5/2002 | Krasnoiarov et al. | 707/513 |
| 2002/0065851 | A1 * | 5/2002 | Watson et al. | 707/513 |

(Continued)

FOREIGN PATENT DOCUMENTS

WO   WO 2007/022323 A2   2/2007

OTHER PUBLICATIONS

U.S. Appl. No. 09/696,627.
U.S. Appl. No. 10/004,301.

(Continued)

*Primary Examiner* — Boris Pesin
*Assistant Examiner* — Ayesha Huertas Torres
(74) *Attorney, Agent, or Firm* — Kilpatrick Townsend & Stockton LLP

(57) ABSTRACT

Functionality available on an enterprise server is applied to HTML content from a remote server. HTML content is collected from remote servers including remote markup tags upon request from an end user. The HTML content for the remote markup tags is parsed and converted to content formatted for enterprise server functionality. The converted content is executed at the enterprise server. Remote server and enterprise server data are then transmitted to the end user. Tags and/or libraries may be extensible, such that they may be created or modified, and the tags may or may not be included within a supplied library of tags and/or a created library of tags, or any combination thereof.

44 Claims, 2 Drawing Sheets

(56) References Cited

U.S. PATENT DOCUMENTS

| | | | |
|---|---|---|---|
| 2002/0101431 A1* | 8/2002 | Forney et al. | 345/582 |
| 2002/0116412 A1* | 8/2002 | Barnes et al. | 707/513 |
| 2002/0156812 A1 | 10/2002 | Krasnoiarov et al. | 707/513 |
| 2003/0126558 A1* | 7/2003 | Griffin | 715/513 |
| 2003/0140307 A1* | 7/2003 | Bar-Yossef et al. | 715/500 |
| 2003/0163446 A1 | 8/2003 | Frieden et al. | 707/1 |
| 2003/0225765 A1 | 12/2003 | Frieden et al. | 707/9 |
| 2004/0060003 A1* | 3/2004 | Mani et al. | 715/513 |
| 2004/0103078 A1 | 5/2004 | Smedberg et al. | 707/1 |
| 2004/0133848 A1* | 7/2004 | Hunt et al. | 715/500 |
| 2004/0199497 A1* | 10/2004 | Timmons | 707/3 |
| 2004/0210569 A1 | 10/2004 | Frieden et al. | 707/3 |
| 2004/0267817 A1 | 12/2004 | Frieden et al. | 707/104.1 |
| 2005/0074126 A1 | 4/2005 | Stanko | 380/279 |
| 2005/0097092 A1 | 5/2005 | Annau et al. | 707/3 |
| 2005/0108732 A1* | 5/2005 | Musson et al. | 719/328 |
| 2006/0036734 A1* | 2/2006 | Breeden et al. | 709/225 |
| 2006/0053368 A1* | 3/2006 | Bosworth et al. | 715/513 |
| 2007/0006069 A1* | 1/2007 | Smith et al. | 715/513 |

OTHER PUBLICATIONS

U.S. Appl. No. 09/896,039.
U.S. Appl. No. 10/966,359.
Website printout: JSR-000168 Portlet Specification—remote content (http://jcp.org/aboutJava/communityprocess/final/jsr168/).
Website printout: JavaServer Pages (JSP) tag libraries (http://java.sun.com/products/jsp/taglibraries/index.jsp).
Website printout: ASP.NET Server Controls (http://msdn.microsoft.com/library/en-us/vbcon/html/vbconintroductiontowebformscontrols.asp)
PCT Notification of Transmittal of the International Search Report and the Written Opinion of the International Searching Authority, or the Declaration, for PCT Application No. PCT/US2006/032068, Nov. 13, 2007, 10 pages.

* cited by examiner

EXTENSIBLE REMOTE TAG MARKUP SYSTEM AND METHOD

FIELD OF THE INVENTION

The invention relates to remote tag markup systems and methods, that are particularly extensible such that functionality available on an enterprise server may be applied to HTML content from a remote server, and content may be developed using a combination of enterprise server functionality and content development tools available at the remote server.

DESCRIPTION OF THE RELATED ART

Java Server Pages (JSP) Tags provide Tag Markup Systems. According to the Sun Developer Network (see, http://java.sun.com/products/jsp/taglibraries/index.jsp, which is hereby incorporated by reference) JavaServer Pages (JSP) tag libraries define declarative, modular functionality that can be reused by any JSP page. Tag libraries reduce the necessity to embed large amounts of Java code in JSP pages by moving the functionality of the tags into tag implementation classes. These are generally executed on a Web Server or an Application Server, but not on a remote Enterprise System. In this regard, the JSR-000168 Portlet Specification (see, http://jcp.org/aboutJava/communityprocess/final/jsr168/) is also hereby incorporated by reference.

.NET Server Controls also provide Tag Markup Systems. According to MSDN (see, http://msdn.microsoft.com/library/default.asp?url=/library/en-us/vbcon/html/vbconintroductiontowebformscontros.asp, which is hereby incorporated by reference), when a user creates Web Forms pages, the following types of controls are available to the user: HTML server controls, Web server controls and validation controls.

HTML server controls expose HTML elements to a server for programming. HTML server controls also expose an object model that maps to the HTML elements that they render.

Web server controls generally have more built-in features than HTML server controls. Web server controls include not only form-type controls such as buttons and text boxes, but also special-purpose controls such as a calendar. Web server controls are more abstract than HTML server controls in that their object model does not necessarily reflect HTML syntax.

Finally, validation controls may be attached to an input control to test what a user enters for that input control. Validation controls incorporate logic permitting testing of a user's input and are provided to allow checking for a required field, to test against a specific value or pattern of characters, to verify that a value lies within a range, and so on. User controls may be created as Web Forms pages. Web Forms can be embedded as user controls in other Web Forms pages, which is a way to create menus, toolbars, and other reusable elements.

The Plumtree enterprise web suite provides portal, integration, search, collaboration and content management services. The fundamental architecture of the Plumtree system is well known and described at www.Plumtree.com, and at white papers and other resources available there such as the Plumtree Corporate Portal 5.0J, Portlet Standards: Plumtree Products for JSR 168 and WSRP Compatibility, and Plumtree Software: 1997-2004: Our Products, Our Vision. Further features are described at US Pat. No. 6,804,662, and US published patent applications nos. 2002/0055956, 2002/0156812, 2003/0163446, 2004/0210576, 2004/0267817, 2004/0210569, 2004/0103078, 2003/0225765, 2005/0097092, and 2005/0074126, and U.S. patent applications Ser. Nos. 09/696,627, 10/004,301, 09/896,039, and 10/966,359. The Plumtree web site and resources available there, and these white papers and patent references are all hereby incorporated by reference.

In addition, Plumtree Transformer Tags (e.g., up to Portal version 5.0.4) advantageously implement several Remote Markup Tags. It is desired to provide an even more extensible framework for creating Remote Markup Tags.

SUMMARY OF THE INVENTION

Accordingly, an extensible remote markup tag system is provided. The system includes an enterprise server, a gateway, a transformer component and a tag transformation engine. The enterprise server receives a request for data from an end user, and ultimately returns processed content to the end user. The gateway collects HTML content from one or more remote servers including one or more remote markup tags. The transformer component parses the HTML content for the remote markup tags, and converts the HTML content for the remote markup tags to content formatted for enterprise server functionality. The tag transformation engine executes the remote markup tags, thereby permitting processed content to be returned to the end user. Advantageously, functionality available on an enterprise server is applied to HTML content from a remote server, and content is developed using a combination of enterprise server functionality and content development tools available at the remote server.

The system may further include a supplied library of remote markup tags that is extendable. The library may be extendable by creation of remote markup tags to be executed at the enterprise server.

The system may also include a local tag markup system and/or current user information that is accessible through the remote markup tags. The current user information may include user login information.

The system may also include enterprise server data that is accessible beyond what is exposed by an enterprise server remote access API. This enterprise server data may also be modifiable.

The system may include a library manager for providing the remote markup tags to the engine. The library manager may retrieve the tags from an external library The system may include an API that is accessible to permit customization, creation or modification of tags, or combinations thereof. The transformer component may further retrieve one or more tags from a tag library manager of a supplied or custom library, or both.

A method is also provided for applying functionality available on an enterprise server to HTML content from a remote server, and permitting content developers to use a combination of enterprise server functionality and their own content development tools. The method includes receiving a request for data from an end user. HTML content is collected from one or more remote servers including one or more remote markup tags. The HTML content is parsed for the remote markup tags, and converted to content formatted for enterprise server functionality. The converted content is executed at the enterprise server. The remote server data and enterprise server data is then transmitted to the end user.

The method may also include permitting content developers to extend a supplied library of remote markup tags and/or create a new library of tags. This extending may include creating remote markup tags to be executed at the enterprise server.

The method may further include building a local tag markup system and/or accessing current user information through the remote markup tags. The current user information may include user login and management services to web applications.

The method may also include accessing enterprise server data beyond what is exposed by an enterprise server remote access API. Enterprise server data may be modifiable.

The method may include accessing an API that permits customization, creation or modification of tags, or combinations thereof. The converting may include retrieving one or more tags from a tag library manager of a supplied or custom library, or both.

One or more processor readable storage devices having processor readable code embodied thereon are also provided. The processor readable code is for programming one or more processors to perform a method of applying functionality available on an enterprise server to HTML content from a remote server, and permitting content developers to use a combination of enterprise server functionality and their own content development tools.

DETAILED DESCRIPTION OF THE PREFERRED EMBODIMENTS

An Extensible Remote Markup Tag System in accordance with a preferred embodiment is designed to allow HTML coming from a Remote Server (i.e. a Portlet) to take advantage of functionality available on an Enterprise Server. By extensible, it is meant that tags and/or libraries may be created and/or modified, and tags may or may not be included within a supplied library of tags and/or a created library of tags. Extensibility allows one to add and/or modify components to provide new and/or modified functionality. An Enterprise Server aggregates remote content and executes remote markup tags.

A Content Developer may include special Remote Markup Tags in their HTML in order to use Enterprise Server functionality. When a request for data comes in to the portal from an end user, an Enterprise Server (i.e. a Portal) collects HTML content from remote servers, including Remote Markup Tags. The Enterprise Server then parses the HTML content for the Remote Markup Tags and converts them to the appropriate content using the Enterprise Server functionality. The resulting content, which is a mix of data from the remote server and the Enterprise Server, is then transmitted back to the end user.

Content or System Developers are also able to extend a supplied library of Remote Markup Tags. They do this by creating their own Remote Markup Tags which can be executed by the Enterprise Server.

Current Tag Markup Systems convert tags into HTML tags on the remote Web Server or Application Server and then transmit the HTML directly to the end user. This means that Content Developers working with an Enterprise Server either develop their content exclusively using the Enterprise Server, or using their preferred Web Server or Application Server. If they develop using the Enterprise Server, then they are not using their normal Content Development Tools. If they generate the content on their preferred Web Server or Application Server, then they are not leveraging the functionality of the Enterprise Server.

This system allows Content Developers to use their preferred Content Development Tools as well as to use the functionality of an Enterprise Server. The HTML content with Tags is served from a remote Web Server or Application Server and then transmitted to the Enterprise Server. The Enterprise Server then transforms the Tag content into the final HTML and transmits it to the end user. Content or System Developers are also able to extend the original functionality of the Enterprise Server by creating their own Remote Markup Tags to access and/or modify data on the Enterprise Server.

Figure 1:
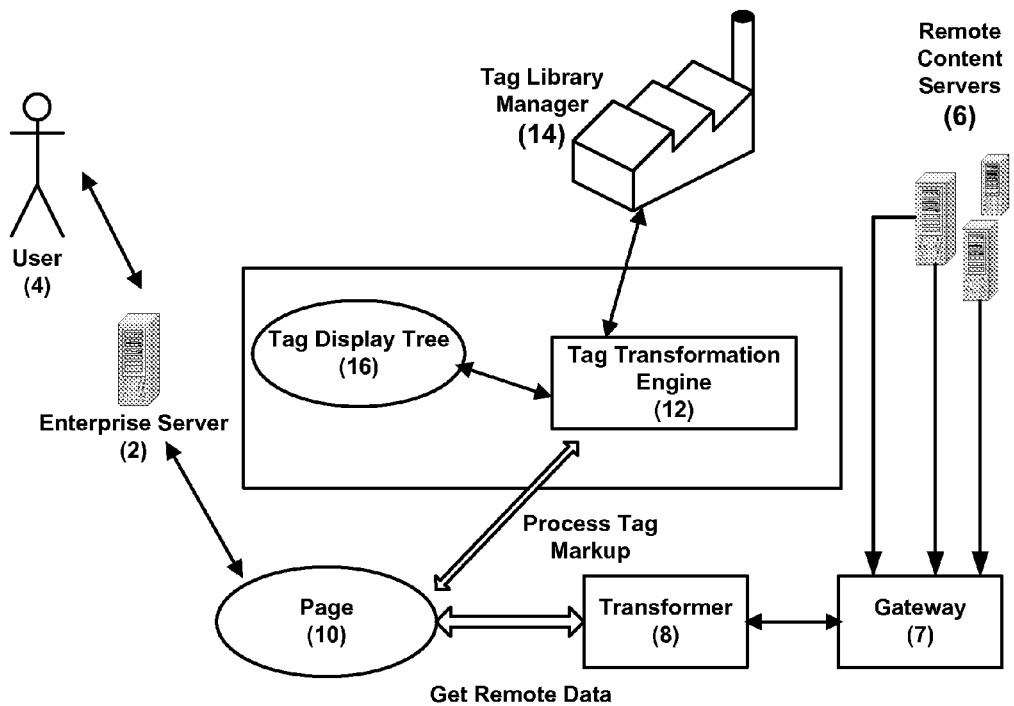
FIG. 1 schematically illustrates a remote tag markup system in accordance with a preferred embodiment.

The Remote Markup Tag System is built on several different components. Referring to the illustrative example provided at FIG. 1, the remote content is brought into the Enterprise System through a combination of a Gateway 7 and a Transformer 8. The Gateway 7 collects the data from multiple Remote Content Servers 6 (i.e. Portlet Servers) in parallel. The Transformer 8 then parses that data and converts it into a format usable in the Tag Transformation Engine 12. A Tag Transformation Engine 12 executes the Remote Markup Tags and the Enterprise System then returns the processed content to the end user 4.

A request from the end user 4 may come into the Enterprise System (i.e. the Portal Server) 2. Remote Server Content (i.e. portlet data) may be requested from the remote content servers 6. The Transformer 8 gets the remote content data from the remote content servers 6 and returns it to the page 10 (i.e. the web page to be displayed to the user). Traditional jsp tags or asp.net controls will get executed on the remote content servers 6, before the Remote Markup Tags are executed. The page 10 then calls the Remote Markup Tag Transformation Engine 12 to process the tags. The Engine 12 gets the requested tags from the Tag Library Manager 14 and builds a tree 16 of HTML fragments and tags. The tree 16 is then processed (executing the tags) and the result is returned to the page 10, which displays it to the end user 2.

Tag Transformation Engine

The Tag Transformation Engine 12 takes the HTML with Remote Markup Tags provided by the Transformer, processes it, and displays the tags.

The Transformer provides an ordered list of Object Markup data including Markup Fragments (i.e. text and HTML) and XML Fragments and related data (i.e. XML attributes, whether the tag is a singleton tag or an open or close tag).

Figure 2:
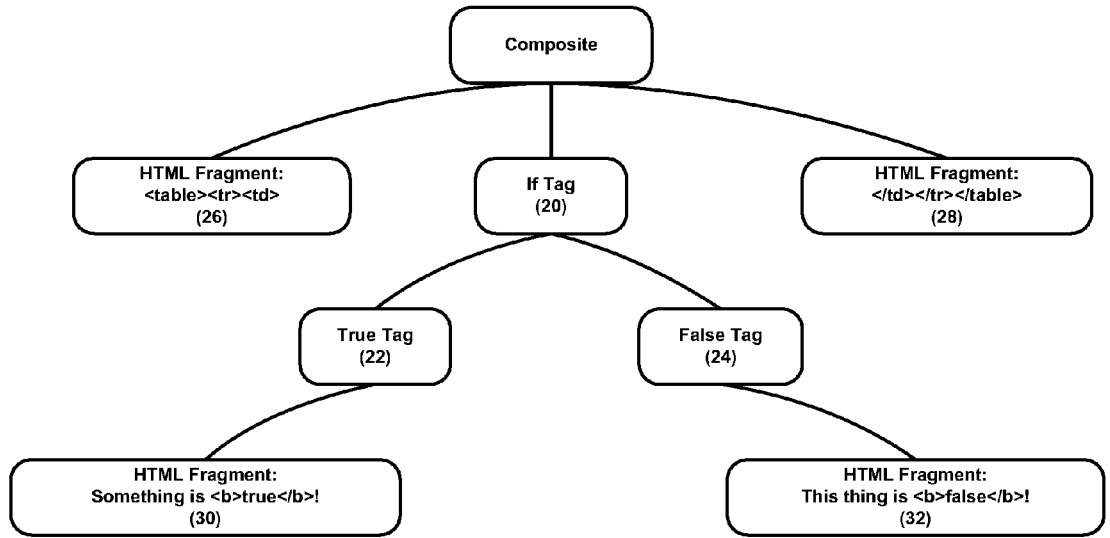
FIG. 2 schematically illustrates a display tree of a remote tag markup system in accordance with a preferred embodiment.

First, the Tag Transformation Engine builds a display tree 16 from the Object Markup Data. FIG. 2 schematically illustrates a display tree 16.

As an example, the following HTML may be generated by a remote server:

```
<table><tr><td><pt:logic.if expression="user.id == 2">
<pt:logic.true>Something is <b>true</b>!</pt:logic.true>
<pt:logic.false>This thing is <b>false</b>!</pt:logic.false>
</pt:logic.if></td></tr></table>
```

This HTML would get transformed according to this embodiment by the Tag Transformation Engine 12 into the display tree illustrated at FIG. 2. The If Tag 20 would process the supplied expression and tell either the True Tag 22 or the False Tag 24 to display itself, displaying one of the underlying HTML fragments 30 or 32. The content returned to the end user would either contain the true message 30 or the false message 32. For example, the following HTML might be returned to the end user if the expression is true:

<table><tr><td>Something is <b>true</b>!</td></tr></table>

An example of a tag that would take advantage of the increased functionality available on the Enterprise Server would be a tag that queries the Enterprise Database for some user data only available through the Enterprise Server or a tag that modified data in the Enterprise Database due to some user action performed in the Remote Content.

Figure 3:
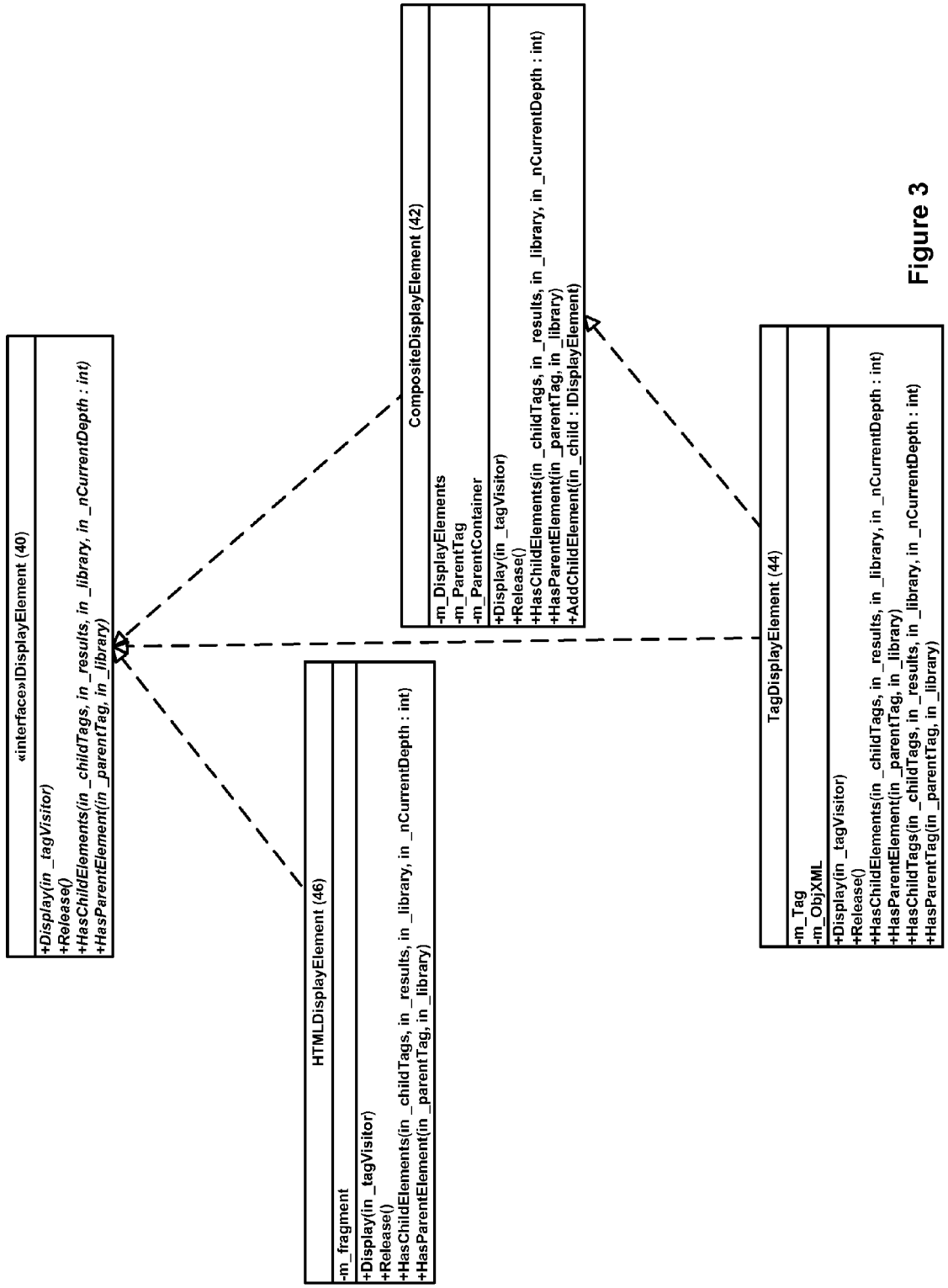
FIG. 3 schematically illustrates a tag display tree infrastructure in accordance with a preferred embodiment.

FIG. 3 schematically illustrates a tag display tree infrastructure in accordance with a preferred embodiment. IDisplayElement 40 specifies the basic interface for DisplayElement classes. CompositeDisplayElement 42 is used to group together different DisplayElements. TagDisplayElement 44 extends CompositeDisplayElement 42 in order to contain other DisplayElements. CompositeDisplayElement 42 is preferably configured such as never to be used by itself.

The Tag Transformation Engine converts each fragment into either an HTMLDisplayElement (Markup Fragments) 46 or a TagDisplayElement (XML Fragments) 44 and puts these elements into a hierarchical tree 16 (see FIGS. 2 and 3). This process will notice any unclosed tags, add an error message to the tree, and try to process the invalid Object Markup Data as best as possible. The tag tree preferably uses Lazy Initialization to minimize processing until it is determined whether a tag will actually be executed (e.g., whether a conditional tag is used to only display certain HTML or tags if a condition is true). This means that none of the tag Object Data is processed when building the tree, but is preferably only processed when the tag is going to be executed.

The TagVisitor object, which contains Application Server and Enterprise Server context information, is then constructed and used to display the tag tree. The TagVisitor object is passed into each DisplayElement, which displays its content and then passes the TagVisitor object into its child DisplayElements to display them, if necessary.

The HTMLDisplayElement 46 converts its Markup Fragment to a text string and outputs that. Since the Transformer converts all the HTML in between Transformer Tags to HTML Fragments, HTMLDisplayElements 46 have no child tags and are a text string.

The TagDisplayElement 44 both displays its content (i.e. executes the Transformer Tag), and displays its child DisplayElements. The Tag is initialized from the Object Data, and then the tag context is validated. Validation includes checking that the tag has the appropriate parent and/or child tags, and that the tag has the required attributes. Validation also checks that all tag attributes are of the appropriate type (e.g. integer, string, Boolean). If there are any errors, either in the tag context, or in the actual execution of the tag, the DisplayElement will output an HTML comment including details of the error.

The HTML resulting from executing the tag display tree is then returned to the Enterprise Server for display to the end user.

Extensible Remote Markup Tag Execution

When a tag is executed, there are various helper methods in the base tag class that allow the tag author to access tag attributes, in-memory variables and Web Application and Enterprise Server data.

The Tag can store and retrieve variables from six different scopes: Application, Session, Persistent Session, Request, Portlet, and Tag Scope. These scopes all behave in slightly different ways and allow the tag author to specify the exact duration and visibility of the stored variable (i.e., tag Scope allows the variable to be accessed by the current tags and all tags inside it, but not by other tags in different parts of the tree). Variables can also be specified as private to the tag library, so that the author doesn't have to worry about variable naming conflicts. In memory variables allow communication between tags, such as with the If/Else example tags.

Tag Authors also have access to the Web Application data, including the HTTP Session and the Web Application. This allows tag authors to base their tag behavior on data such as the user's browser or IP address.

The tag has the option of calling the ProcessTagBody method, which processes all the HTML and Transformer Tags inside the current tag. If a tag does not call the ProcessTagBody method (such as in a conditional tag), then the portion of the tag tree beneath the current TagDisplayElement 44 will not be executed.

Remote Markup Tag Development

In order to develop new Extensible Remote Markup Tags, a developer extends a base Tag class to implement custom code. This can currently be done in either Java or C#. The base Tag class allows the developer to output HTML content based on XML tag attributes (i.e. <pt:lib.tag attribute="true"/>), as well as surrounding tags and the current state of the Enterprise Server. The base Tag class provides access to tag attributes (as well as automatic validation of the attributes), and data stored in memory on the Enterprise Server, and provides direct access to the Enterprise System objects.

Tag Library documentation can be automatically generated by a TagDoc System that uses 3rd party tools to transform source code comments into HTML documentation.

Remote Markup Tag Language

The Remote Markup Tags are used in the remote server content almost the same way as standard HTML Tags. There are two major differences.

The first difference is that all Remote Markup Tags must be in a special namespace so that they can be recognized by the Transformer as Remote Markup Tags. This means that the actual tag names will be prefaced with a namespace defined previously in the remote server content (i.e <pt:logic.foreach/>).

The second difference is that Remote Markup Tags can have their attributes calculated dynamically at runtime and replaced with data from the Enterprise System. If the tag attributes start with a special reserved character (e.g., $), when the tag is executed the attribute will be replaced with dynamic data such as in-memory variables, items from a list, or localized strings from the Enterprise System.

Transformer

The Transformer 8 (see FIG. 1) takes raw HTML with XML compliant transformer tags from the Remote Servers and converts it into Markup and XML Fragments. The transformer 8 can also perform relatively minor data processing for URLs, namespaces, etc. . . . . The Transformer 8 parses the HTML and provides the Tag Transformation Engine 12 with an ordered list of Object Markup data. This list includes the Markup Fragments (i.e. text and standard HTML), as well as the XML Fragments and related data (i.e. XML attributes, singleton tag vs. open or close tag, etc. . . ) in the order that they appeared in the original markup.

The Transformer 8 is preferably a Finite State Transformer that has at least two advantageous purposes when it processes the content from the remote servers. The first is to process URLs pointing to protected content on the remote servers and convert them into URLs that go through the gateway on the Enterprise System. Since Remote Servers may not be directly accessible from end user machines (e.g. due to firewalls), the URLs need to be converted to go to the outward facing Enterprise Server, which will then display the requested content from the Remote Servers. As well as transforming URLs in both HTML and JavaScript, the Transformer converts predefined constant URIs into commonly used URLs, such as an image server URL.

The second purpose is to convert the Remote Server content into an ordered list of HTML and Markup Fragments and XML Fragments. The HTML and Markup Fragments are simply text, while the XML Fragments store information about the Transformer Tags, such as attributes and tag type (e.g. closed, open, singleton).

A Finite State Machine is used for performance reasons. A Finite State Machine consists of various states, as well as rules for how to transition from one state to another depending upon the input.

In this case, the Finite State Transformer searches through the Remote Server content until it finds an open bracket. It then transitions to various states depending upon what kind of tag is found. Tags that can contain URLs, such as anchors or JavaScript tags, are processed for URLs, Remote Markup Tags are converted into XML Fragments, and other HTML tags are generally ignored.

Anchors and other HTML tags that contain URLs are marked for post-processing if their URLs refer to protected content on the Remote Server.

Entering a script tag turns on JavaScript processing, which checks for URLs in JavaScript, such as in a window.open method. JavaScript URLs are then wrapped in a helper method that will process the URL at runtime.

After having converted all of the Remote Server content, the ordered list of Fragments is cached for later re-use. The ordered list is then post-processed and various URLs and URIs as well as certain Transformer Tags are converted. The predefined constant URIs are replaced with the appropriate URLs, and the URLs to protected Remote Server content are transformed to go through the Enterprise System gateway. The processed content is then passed to the Tag Transformation Engine.

The present invention is not limited to the embodiments described above herein, which may be amended or modified without departing from the scope of the present invention as set forth in the appended claims, and structural and functional equivalents thereof. For example, the invention can also be utilized in building a local Tag Markup System, similar to pre-existing JSP Tags and .NET Web Controls systems. Another alternative use could be to provide access to user information in an Identity Management Application Development System. Such a system could include a framework that provides user login and management services to standard web applications. These would access current user information through Remote Markup Tags.

Other functionality can be implemented by accessing Enterprise Server data from a Remote Web Server and using the data to create HTML. For instance, a portlet developer could access Plumtree Portal information using the Plumtree EDK remote access API and then turn it into HTML data on the Remote Portlet Server. Advantageously, a system in accordance with the preferred embodiment permits a portlet developer to access or modify Enterprise Server data beyond what is exposed by a remote access API, if any.

In methods that may be performed according to preferred embodiments herein and that may have been described above and/or claimed below, the operations have been described in selected typographical sequences. However, the sequences have been selected and so ordered for typographical convenience and are not intended to imply any particular order for performing the operations.

In addition, all references cited above herein, in addition to the background and summary of the invention sections, are hereby incorporated by reference into the detailed description of the preferred embodiments as disclosing alternative embodiments.

What is claimed is:

1. A method for applying functionality available on an enterprise server to content from a remote server, the method comprising:

receiving, at an enterprise server configured to provide one or more enterprise server functions, a request for data from an end user;

receiving, at the enterprise server, content obtained from one or more remote servers comprising content annotated using one markup language and content annotated using another markup language having one or more remote markup tags each configured to identify at least one of the one or more enterprise server functions, at least some of the one or more remote markup tags being supplied tags found in a predefined library of tags directed to the one or more enterprise server functions, customized tags based on the supplied tags found the predefined library, created tags added to the predefined library, modified tags based on the supplied tags found the predefined library, or combinations thereof;

converting, with one or more processors associated with the enterprise server, the received content to at least content formatted for execution by the enterprise server based on the one or more remote tags;

executing, with one or more processors associated with the enterprise server, the converted content to generate enterprise server data in response to performing one or more of the one or more enterprise server functions identified by the one or more remote markup tags in the content received from the one or more remote servers; and transmitting, with one or more processors associated with the enterprise server, remote server data and the generated enterprise server data to the end user.

2. The method of claim 1, further comprising permitting content developers to extend a supplied library of remote markup tags or create a new library, or a combination thereof.

3. The method of claim 2, wherein the extending comprises creating remote markup tags to be executed at the enterprise server.

4. The method of claim 1, further comprising building a local tag markup system.

5. The method of claim 1, further comprising accessing current user information through the remote markup tags.

6. The method of claim 5, wherein the accessing of current user information comprises accessing user login and management services to web applications.

7. The method of claim 1, further comprising accessing enterprise server data beyond what is exposed by an enterprise server remote access application program interface (API).

8. The method of claim 7, further comprising modifying said enterprise server data.

9. The method of claim 1, further comprising utilizing an API that permits customization, creation or modification of tags, or combinations thereof.

10. The method of claim 1, wherein the converting comprises retrieving one or more tags from a tag library manager of a supplied or custom library, or both.

11. A system for applying functionality available on an enterprise server to content from a remote server, the system comprising:
a processor; and
a memory configured to store a set of instructions which when executed by the processor configure the processor to:
receive a request for data from an end user;
receive content from one or more remote servers comprising content annotated using one markup language and content annotated using another markup language having one or more remote markup tags each configured to identify at least one of the one or more enterprise server functions;
parse the collected content received from the one or more remote servers for the remote markup tags
convert the received content to at least content formatted for execution by the enterprise server based on the one or more remote tags; and
execute the converted content to generate enterprise server data in response to performing one or more of the one or more enterprise server functions identified by the one or more remote markup tags and
transit remove server data and the generated enterprise server data to the end user.

12. The system of claim 11, further comprising a supplied library of remote markup tags that is extendable or a created library, or a combination thereof.

13. The system of claim 12, wherein the library is extendable by creation, modification or customization of remote markup tags, or combinations thereof, to be executed at the enterprise server.

14. The system of claim 11, further comprising a local tag markup system.

15. The system of claim 11, further comprising current user information that is accessible through the remote markup tags.

16. The system of claim 15, wherein the current user information comprises user login information.

17. The system of claim 11, further comprising enterprise server data that is accessible beyond what is exposed by an enterprise server remote access API.

18. The system of claim 17, wherein the enterprise server data is also modifiable.

19. The system of claim 11, further comprising a library manager for providing the remote markup tags to the engine.

20. The system of claim 19, wherein the library manager retrieves the tags from an external library.

21. The system of claim 11, further comprising an API that is accessible to permit customization, creation or modification of tags, or creation of a new library, or combinations thereof.

22. The system of claim 11, wherein the tag transformation engine component is further for retrieving one or more tags from a tag library manager of a supplied or custom library, or both.

23. A non-transitory computer-readable medium having processor-executable code embodied thereon which when executed by one or more processors of one or more computer systems configure the one or more processors for applying functionality available on an enterprise server to content from a remote server, the non-transitory computer-readable medium comprising:
code for receiving, at an enterprise server configured to provide one or more enterprise server functions, a request for data from an end user;
code for receiving, from one or more remote servers, content comprising content annotated using one markup language and content annotated using another markup language having one or more remote markup tags each configured to identify at least one of the one or more enterprise server functions, at least some of the one or more remote markup tags being supplied tags found in a predefined library of tags directed to the one or more enterprise server functions, customized tags based on the supplied tags found the predefined library, created tags added to the predefined library, modified tags based on the supplied tags found the predefined library, or combinations thereof;
code for converting the received content to at least content formatted for execution by the enterprise server based on the one or more remote tags;
code for executing the converted content at the enterprise server to generate enterprise server data in response to performing one or more of the one or more enterprise server functions identified by the one or more remote markup tags in the content received from the one or more remote servers; and
code for transmitting remote server data and the generated enterprise server data to the end user.

24. The non-transitory computer-readable medium of claim 23, further comprising code for permitting content developers to extend a supplied library of remote markup tags.

25. The non-transitory computer-readable medium of claim 24, wherein the code for extending comprises code for creating remote markup tags to be executed at the enterprise server.

26. The non-transitory computer-readable medium of claim 23, further comprising code for building a local tag markup system.

27. The non-transitory computer-readable medium of claim 23, further comprising code for accessing current user information through the remote markup tags.

28. The non-transitory computer-readable medium devices of claim 27, wherein the code for accessing of current user information comprises code for accessing user login and management services to web applications.

29. The non-transitory computer-readable medium of claim 23, further comprising code for accessing enterprise server data beyond what is exposed by an enterprise server remote access application program interface (API).

30. The non-transitory computer-readable medium of claim 29, further comprising code for modifying said enterprise server data.

31. The non-transitory computer-readable medium of claim 23, further comprising code for accessing an application program interface (API) that permits customization, creation or modification of tags, or creation of a new library, or combinations thereof.

32. The non-transitory computer-readable medium of claim 23, wherein the code for converting comprises code for retrieving one or more tags from a tag library manager of a supplied or custom library, or both.

33. The method of claim 1, further comprising:
  forming a tag display tree that comprises an interface display element;
  specifying an interface for display element classes;
  displaying the remote markup tags according to the tag display tree and specified interface.

34. The system of claim 11, wherein:
  the processor is configured to build a tag display tree by processing the collected content and generate information configured for displaying the one or more remote markup tags according to the tag display tree; and
  the tag display tree comprises an interface display element that specifies an interface for display element classes.

35. The non-transitory computer-readable medium of claim 23, further comprising:
  code for forming a tag display tree that comprises an interface display element;
  code for specifying an interface for display element classes; and
  code for generating information configured for displaying the one or more remote markup tags according to the tag display tree and specified interface.

36. The method of claim 33, wherein the tag display tree further comprises a composite display element, and the method further comprises grouping together different display elements.

37. The method of claim 36, wherein the tag display tree further comprises a tag display element, and the method further comprises extending the composite display element to contain other display elements.

38. The method of claim 37, wherein the tag display tree further comprises an HTML display element.

39. The system of claim 34, wherein the tag display tree further comprises a composite display element to group together different display elements.

40. The system of claim 39, wherein the tag display tree further comprises a tag display element that extends the composite display element to contain other display elements.

41. The system of claim 40, wherein the tag display tree further comprises an HTML display element.

42. The non-transitory computer-readable medium of claim 35, wherein the tag display tree further comprises a composite display element, and the method further comprises grouping together different display elements.

43. The non-transitory computer-readable medium of claim 42, wherein the tag display tree further comprises a tag display element, and the method further comprises extending the composite display element to contain other display elements.

44. The non-transitory computer-readable medium of claim 43, wherein the tag display tree further comprises an HTML display element.

* * * * *

UNITED STATES PATENT AND TRADEMARK OFFICE
CERTIFICATE OF CORRECTION

| | | |
|---|---|---|
| PATENT NO. | : 8,745,485 B2 | Page 1 of 1 |
| APPLICATION NO. | : 11/161838 | |
| DATED | : June 3, 2014 | |
| INVENTOR(S) | : Hayler | |

It is certified that error appears in the above-identified patent and that said Letters Patent is hereby corrected as shown below:

In the Specification

In column 1, line 32, delete "contros" and insert -- controls --, therefor.

In column 2, line 45, delete "library" and insert -- library. --, therefor.

In the Claims

In column 10, line 48, in Claim 28, after "medium" delete "devices".

Signed and Sealed this
Ninth Day of December, 2014

Michelle K. Lee
*Deputy Director of the United States Patent and Trademark Office*